United States Patent [19]

Chestnut

[11] Patent Number: 4,930,445
[45] Date of Patent: Jun. 5, 1990

[54] PORTABLE PET HOUSE

[76] Inventor: Joseph C. Chestnut, 4601 Lyric La., San Diego, Calif. 92117

[21] Appl. No.: 272,317

[22] Filed: Nov. 17, 1988

[51] Int. Cl.⁵ .................... A01K 1/00; A01K 31/08
[52] U.S. Cl. .................................. 119/19; 119/15; 119/17
[58] Field of Search ........................... 119/15, 17, 19

[56] References Cited

U.S. PATENT DOCUMENTS

| | | | |
|---|---|---|---|
| 1,616,781 | 2/1927 | Bugenhagen | 119/19 |
| 2,790,414 | 4/1957 | Rossow | 119/19 |
| 2,821,165 | 1/1958 | Wright | 119/15 |
| 2,932,279 | 4/1960 | Giles | 119/15 |
| 3,026,844 | 3/1962 | Spindler | 119/19 |
| 3,195,506 | 7/1965 | Beard | 119/19 |
| 3,234,908 | 2/1966 | Duskocil | 119/19 |
| 3,256,860 | 6/1966 | Parker | 119/19 |
| 3,306,258 | 2/1967 | Hunt | 119/19 |
| 3,618,568 | 11/1971 | Breeden | 119/19 |
| 3,815,549 | 6/1974 | Opmerr | 119/17 |
| 3,885,523 | 5/1975 | Coleman | 119/19 |
| 4,161,924 | 7/1979 | Welker | 119/19 |
| 4,177,761 | 11/1979 | Bellocchi | 119/19 |
| 4,256,056 | 3/1981 | Sou | 119/19 |
| 4,372,251 | 2/1983 | Keith | 119/19 |
| 4,576,116 | 3/1986 | Binkert | 119/19 |
| 4,781,146 | 11/1988 | Spengler | 119/15 |

*Primary Examiner*—Paul J. Hirsch
*Attorney, Agent, or Firm*—Andsel Group

[57] ABSTRACT

A portable pet house having a base plate with channels formed adjacent its periphery that form a closed loop configuration. A plurality of side wall panels each having a frame around the periphery have their bottom edges removably received in said channel. These frames when in their erected position form a closed loop side wall construction. A cover formed of trapezoidal shaped roof panels is supported by a plurality of elongated support rods that have their top ends detachably secured to a dome and whose bottom ends are detachably secured to the respective frames of the side wall panels. A plurality of telescoping leg assemblies are secured to the base plate and they are retractable into a position beneath the base plate. Air ventilation apertures are formed in the base plate to insure a sufficient amount of air for the pet within the pet house.

8 Claims, 1 Drawing Sheet

U.S. Patent
Jun. 5, 1990
4,930,445
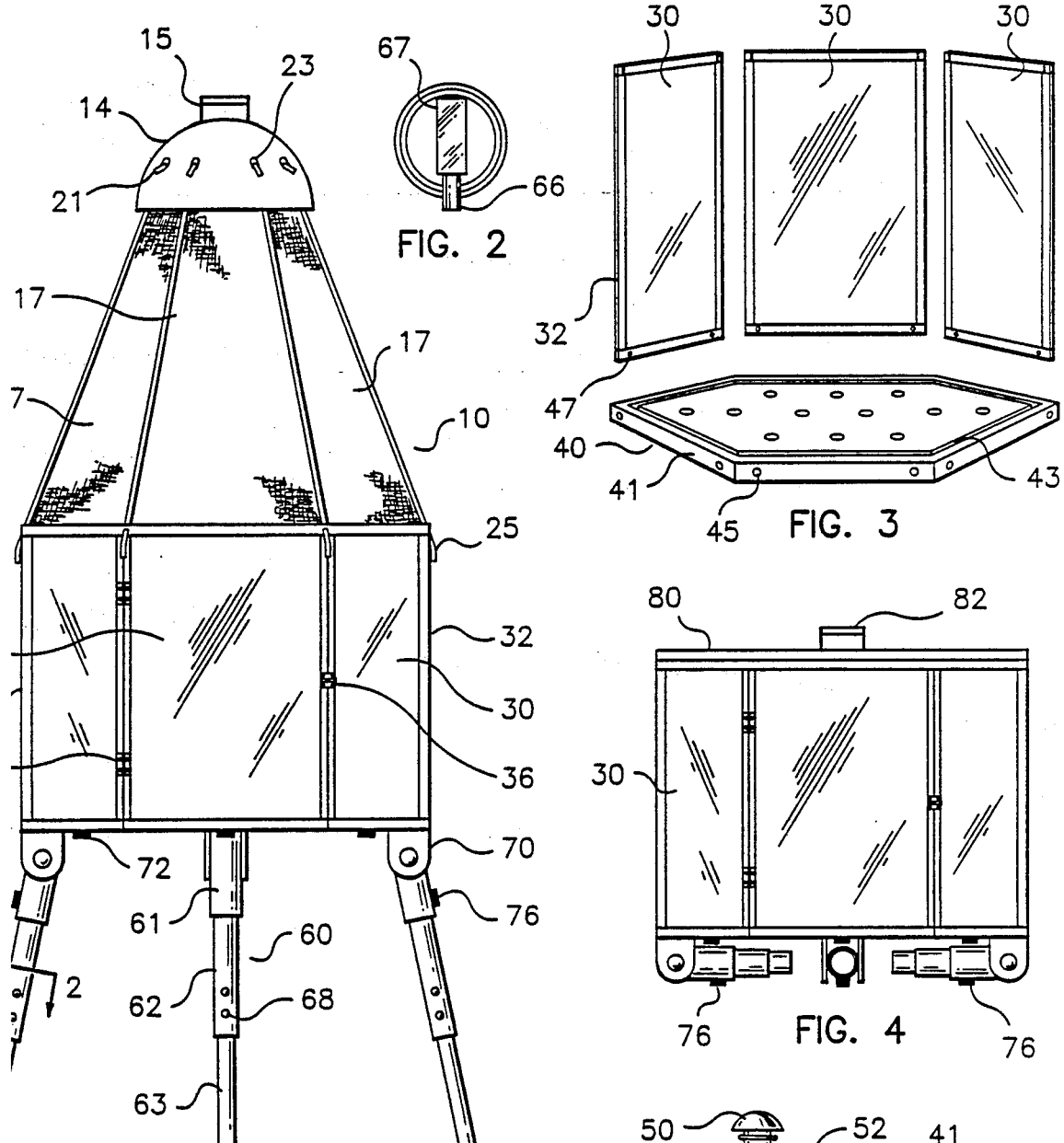
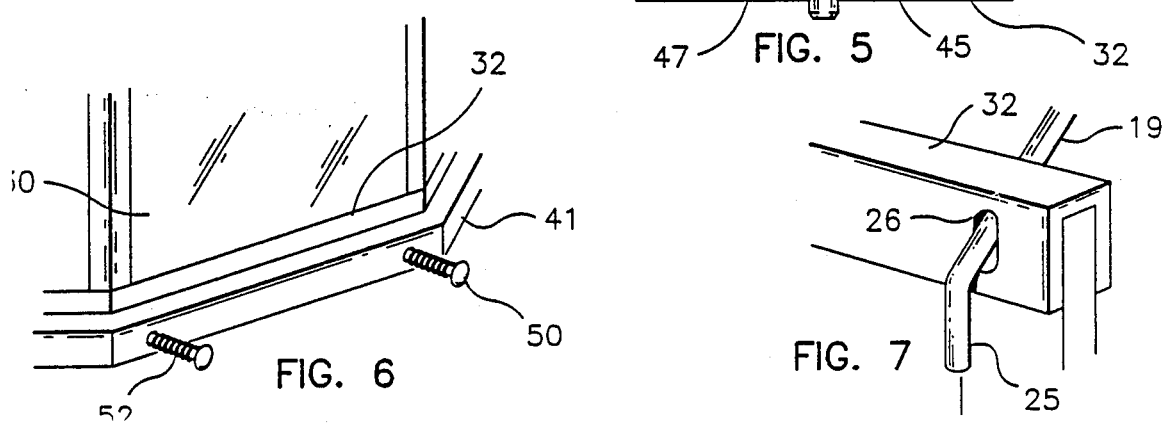

PORTABLE PET HOUSE

BACKGROUND OF THE INVENTION

The invention relates to pets and more specifically to a portable collapsible pet house.

When people own a pet, such as a cat, there are occasions when it is desirable to let the pet outside. The disadvantage of having the pet run loose or keeping it within a fenced area are numerous. For one thing, fleas can jump thirty inches or more and are attracted to body heat or jump when the grass is disturbed by the animals passing. Unless the pet owner takes measures to prevent fleas, they will quickly infest the fur of the animal. Ticks and mites also pose a similar problem.

Other problems are as follows: a cat running loose can be hit by a vehicle; a cat, by its nature, will hunt small animals, and in so doing the animal exposes itself to rabies or bites which can infect others; neighboring cats will challenge the owner's cat for territory and the cats mag fight and get seriously injured; marauding dogs can kill or injure a cat; people may steal a valuable cat; there are fungi which animals can get between their toes and footpads of their paws, while not life threatening, these infections pose unwanted conditions for responsible cat owners.

These are many of the reasons that cat owners do not let valuable cats run loose. Applicant's novel portable cat pet house addresses these problems and solves them. Cat owners can quickly assemble the "Catzeebo", pet house, in a back yard or other protected area and place the animal inside. The telescoping legs place the pet enclosure high enough off the ground that fleas cannot reach the cat.

SUMMARY OF THE INVENTION

Applicant's novel portable pet house is a device which when assembled will house a pet, such as a common house cat, and secure the animal from running free. The pet house can be set out of doors so the animal can get fresh air and not be pestered by fleas or other animals. The basic idea is to provide an open air housing area for a cat wherein the animal is safe from any hazard, is kept secure from running away or being stolen and is comfortable while not in the house.

The portable pet house has a hexagon shaped base plate which supports a plurality of side wall panels each having their own frame. The panels are screened or solid, as the use desires, and form the housing of the pet house. The side wall panels and their frames provide support for the upper roofing section which is constructed of canvas or other similar material. The roof panels are held in place at their bottom by elongated support rods which pass lengthwise through the roofing section. At the top, the roofing sections are held together by means of a cap or dome which connects to the support rods and form a ring. The cap has a handle for lifting and moving the canvas roof when disassembling or moving the pet house.

On the bottom, the base plate is supported by telescoping leg assemblies. The legs of these assemblies are capable of folding up under the base plate when not needed to support the pet house off the ground. In the folded configuration, the pet house will rest upon rubber pads which are attached to the side of each of the telescoping leg assemblies. On the under side of the base plate of the pet house are located rubber stop pads which stop the movement of the telescoping leg assemblies when they are in the folded position. Thus the legs, when folded, provide a non-slip rubber rest. The portable pet house can be set on a table or on the floor and will take up a minimum of space. When the portable pet house is to be transported with the animal inside, the alternate carrying lid is used. This lid has structure on its bottom surface for receiving the top edge of the roof panels. When in place, the carrying lid allows the user to carry the animal inside the pet house. In this configuration, the pet house is ideal for traveling with a pet. Catzeebo offers security for the animal while traveling, and at the same time offers spacious ventilated containment. Upon reaching the destination, user simply unfolds the support legs, replaces the carrying lid with the roof panel members and the portable pet house is ready for outdoor, above ground use. The panels which comprise the side walls of the pet house are available in both screened material or plexiglas. The user can choose between all plexiglas or all screening or any combination desired. When all plexiglas is used, such as when traveling, ventilation is accomplished through the openings in the floor or base plate of the pet house.

DESCRIPTION OF THE DRAWINGS

FIG. 1 is a front elevation view of applicant's novel portable pet house;

FIG. 2 is a cross sectional view taken along lines 2-2 of FIG. 1;

FIG. 3 is a partial perspective view of the housing of the pet house in an exploded view with the front three panels removed for clarity;

FIG. 4 is a side elevation view of the novel portable pet house in its traveling mode;

FIG. 5 illustrates how the frames of the side wall panels are secured to the base plate;

FIG. 6 is a partial front perspective view of the structure for securing the frames of the side wall panels to the base plate; and FIG. 7 is a perspective view illustrating the manner in which the lower end of the support rods are detachably secured to the frames of the side wall panels.

DESCRIPTION OF THE PREFERRED EMBODIMENT

Applicant's novel portable pet house will now be described by referring to FIGS. 1-7 of the drawings. The pet house is generally designated numeral 10.

In FIG. 1, the pet house 10 is illustrated with a cat 12 inside. The pet house has a dome 14 with a handle 15 for carrying it. A plurality of roof panels 17 are supported by elongated support rods 19. The upper tip end 21 of support rods 19 are captured in apertures 23 in dome 14. The lower tip ends 25 of the support rods 19 pass through apertures 26 (see FIG. 7).

The housing 20 of the pet house is formed from a plurality of side wall panels 30 that are mounted in frames 32. One of the side wall panels may be designated an access door 34. It has hinges 35 attached to its one vertical side edge and a latch 36 closes and secures it to the next adjacent frame. Base plate 40 has six external side walls 41. A channel 43 is formed in the top surface of base plate 40 and it receives the bottom edges of the respective frames 32. A plurality of apertures 45 in side walls 41 align with apertures 47 in the bottom edge members of frames 32. The structure for securing these two members together is illustrated in FIGS. 5 and 6. In these Figures locking pins 50 have a spring 52 that will pull the locking pin into aligned apertures 45 and 47 in the respective side wall 41 and frame 30.

The telescoping leg assembly 60 have a plurality of tubular members 61, 62, and 63. Locking pins 66 mounted on springs 67 pass through apertures 68 in the tubular members to lock them in their extended position. A ratchet hinge 70 is secured to the top end of the telescoping leg assemblies and this in turn is secured to the bottom of the base plate 40. Stoppers 72 are mounted on the bottom surface of base plate 40 to limit the extent to which the telescoping leg assemblies may be pivoted toward base plate 40. Footrest rubber pads 76 are on the lateral surface of tubular sleeves 61 and provide a support structure for the portable pet house 10 when it is in its folded position. In FIG. 4 a flat cover 80 has replaced the set up roof panel assembly structure illustrated in FIG. 1. It has a carrying handle 82.

What is claimed is:

1. A portable pet house comprising:
    a plurality of rectangularly shaped side wall panels each having a frame around their periphery, said frames when in their erected position forming a closed side wall construction;
    a horizontally oriented base plate having a predetermined peripheral contour and also a bottom surface, said base plate having a relatively short height wall that extends upwardly around its periphery, said base plate having a top surface having a channel spaced inwardly from its periphery that extends around the peripheral edge of said base plate for removably receiving the bottom edge of said side wall panel frames;
    means for securing the side wall panel frames in the channels on the top surface of said base plate;
    at least three telescoping legs assemblies; each of said leg assemblies have a plurality of tubular members that telescopically retract within one another, one of said tubular members being pivotally secured to a ratchet hinge that is attached to the bottom surface of said base plate so that said leg assemblies may be folded inwardly under said bottom surface toward each other when the portable pet house is in its traveling mode, a stopper for each leg assembly mounted on the bottom surface of said base plate to limit the extent to which the leg assemblies may be pivoted toward the bottom surface of said base plate, a foot rest pad is mounted on the lateral surface of each of said leg assemblies to provide a support surface for the portable pet house when it is in its folded position; and
    a cover for the top area of the frames of said side wall panels, a handle is secured to said cover.

2. A portable pet house as recited in claim 1 wherein said cover is a flat lip shaped member.

3. A portable pet house as recited in claim 1 wherein said cover comprises a plurality of trapezoidal shaped roof panels and a plurality of elongated support rods whose top ends are detachably secured to a dome and whose bottom ends are detachably secured to the respective frames of said wall panels.

4. A portable pet house as recited in claim 1 wherein said side wall panels are made of screen material.

5. A portable pet house as recited in claim 3 wherein said roof panels are made of canvas material.

6. A portable pet house as recited in claim 1 wherein one of the frames of said side wall panels is an access door.

7. A portable pet house as recited in claim 1 wherein said base plate has a hexagonal configuration.

8. A portable pet house as recited in claim 1 further comprising air ventilation apertures in said base plate.

* * * * *